(12) United States Patent
Asahina et al.

(10) Patent No.: US 7,834,103 B2
(45) Date of Patent: Nov. 16, 2010

(54) HIGHLY CROSSLINKABLE LOW-VISCOSITY POLYISOCYANATE COMPOSITION AND COATING COMPOSITION CONTAINING SAME

(75) Inventors: Yoshiyuki Asahina, Tokyo (JP); Hironori Katagawa, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 40 days.

(21) Appl. No.: 12/066,442

(22) PCT Filed: Oct. 19, 2006

(86) PCT No.: PCT/JP2006/320857

§ 371 (c)(1),
(2), (4) Date: Mar. 11, 2008

(87) PCT Pub. No.: WO2007/046470

PCT Pub. Date: Apr. 26, 2007

(65) Prior Publication Data

US 2009/0131603 A1    May 21, 2009

(30) Foreign Application Priority Data

Oct. 21, 2005    (JP) .............................. 2005-307187

(51) Int. Cl.
*C08F 283/04* (2006.01)
(52) U.S. Cl. ................... 525/453; 525/528; 528/44; 528/73
(58) Field of Classification Search ............ 252/182.21; 525/453, 528; 528/44, 73
See application file for complete search history.

(56) References Cited

U.S. PATENT DOCUMENTS

| 4,801,663 | A | * | 1/1989 | Ueyanagi et al. ............ 525/528 |
| 5,124,427 | A | | 6/1992 | Potter et al. |
| 5,354,834 | A | | 10/1994 | Yoshida et al. |
| 5,914,383 | A | | 6/1999 | Richter et al. |
| 2006/0223968 | A1 | * | 10/2006 | Zielinski et al. ............... 528/44 |

FOREIGN PATENT DOCUMENTS

| CA | 2 244 486 | 2/1999 |
| EP | 0 798 299 | 10/1997 |
| EP | 0 896 009 | 2/1999 |
| JP | 5-70444 | 3/1993 |
| JP | 5-222007 | 8/1993 |
| JP | 3055197 | 4/2000 |
| JP | 2003-55433 | 2/2003 |
| JP | 2003-137966 | 5/2003 |
| JP | 2004-148885 | 5/2004 |
| JP | 2005-15378 | 1/2005 |
| JP | 2005-48179 | 2/2005 |
| JP | 2005-48180 | 2/2005 |

OTHER PUBLICATIONS

Search Report for corresponding European Patent Application No. 06812035.1-2115 dated Jul. 28, 2010.

* cited by examiner

*Primary Examiner*—David Wu
*Assistant Examiner*—Robert Jones, Jr.
(74) *Attorney, Agent, or Firm*—Finnegan, Henderson, Farabow, Garrett & Dunner, L.L.P.

(57) ABSTRACT

Disclosed is a polyisocyanate composition derived from an aliphatic diisocyanate monomer and an alcohol, which satisfies all the conditions below in a state not containing the aliphatic diisocyanate monomer and a solvent. 1) Isocyanurate trimer concentration: 55-95 mass % 2) Number ratio of allophanate groups derived from the alcohol to isocyanurate groups: 1-20% 3) Urethodione dimmer concentration: 2-25 mass % 4) Viscosity at 25° C.: 150-800 mPa·s.

5 Claims, No Drawings

HIGHLY CROSSLINKABLE LOW-VISCOSITY POLYISOCYANATE COMPOSITION AND COATING COMPOSITION CONTAINING SAME

TECHNICAL FIELD

The present invention relates to a polyisocyanate composition having high crosslinkability, low viscosity and excellent storage stability, and to a coating composition containing the same.

BACKGROUND ART

Conventionally, an urethane coated film formed from a polyurethane coating has extremely excellent flexibility, chemical resistance and stain resistance, and besides, a coated film particularly using a non-yellowing polyisocyanate derived from hexamethylene diisocyanate (hereafter referred to as HDI) as a curing agent further has excellent weather resistance and accordingly increases its demand.

Since interest in protection of the global environment has been recently increased, a technology of decreasing the viscosity of a polyisocyanate compound used as a curing agent has been actively developed. This is because an amount of an organic solvent used in a coating composition can be reduced by decreasing the viscosity of the polyisocyanate compound. (Patent Document 1)

On the other hand, the technologies of decreasing the viscosity have been disclosed, which include various polyisocyanates derived from HDI. One technology among them relates to polyisocyanate having an urethodione group, which has low viscosity (Patent Document 2). The technology provides a polyisocyanate compound having low viscosity, but the polyisocyanate compound has low crosslinkability, and occasionally increases the concentration of a diisocyanate monomer while being stored, so that the use of it is limited.

In polyisocyanate containing only the urethodione group, the statistical average number of isocyanate groups contained in one polyisocyanate molecule (hereafter referred to as average number of isocyanate groups) is 2 regardless of the molecular weight, and the crosslinkability is also inferior.

It has been difficult to simultaneously decrease the viscosity and increase the crosslinkability of polyisocyanate having the urethodione group, because polyisocyanate having an isocyanurate group is also by-produced when the polyisocyanate having the urethodione group is produced. Such polyisocyanate having the urethodione group has been desired as to keep the crosslinkability, have excellent storage stability and show lower viscosity.

Patent Document 1: JP-A-05-222007
Patent Document 2: Japanese Patent No. 3055197

DISCLOSURE OF THE INVENTION

An object of the present invention is to provide a polyisocyanate composition which has an urethodione group, low viscosity, and excellent crosslinkability, and does not produce a diisocyanate monomer when the polyisocyanate is stored.

The present inventors made an extensive investigation, as a result, solved the above described problems by using particular polyisocyanate, and arrived at the present invention. Specifically, the present invention is as described below.

1. A polyisocyanate composition derived from at least one or more compounds respectively selected from aliphatic diisocyanate monomers and alcohols, and satisfies all of the following requirements when the composition contains no aliphatic diisocyanate monomer and no solvent:
   1) the concentration of an isocyanurate trimer is 55 mass % to 95 mass %;
   2) a number ratio of allophanate groups derived from the alcohol to isocyanurate groups is 1 to 20%;
   3) the concentration of an urethodione dimer is 2 to 25 mass %; and
   4) a viscosity at 25° C. is 150 to 800 mPa·s.
2. The polyisocyanate composition according to the above item 1, wherein the alcohol is a monoalcohol.
3. The polyisocyanate composition according to the above item 1 or 2, wherein the concentration of the isocyanurate trimer is 60 to 95 mass %.
4. The polyisocyanate composition according to any one of the above items 1, 2 and 3, wherein the aliphatic diisocyanate is hexamethylene diisocyanate.
5. A coating composition comprising a polyol and the polyisocyanate composition according to any one of the above items 1, 2, 3 and 4.

BEST MODE FOR CARRYING OUT THE INVENTION

The present invention will now be described in detail below.

An aliphatic diisocyanate monomer which can be used in the present invention (hereafter merely referred to as diisocyanate) is a diisocyanate compound which does not contain a benzene ring in its structure. The aliphatic diisocyanate monomer has preferably 4 to 30 carbon atoms, and for instance, includes tetramethylene-1,4-diisocyanate, pentamethylene-1,5-diisocyanate, and hexamethylene diisocyanate. Among those, hexamethylene diisocyanate (HDI) is preferable because of having satisfactory weather resistance and being industrially available. The aliphatic diisocyanate monomers may be used alone or in combination.

An alcohol which can be used in the present invention is preferably an alcohol formed only from carbon, hydrogen and oxygen, and is further preferably a monoalcohol. A preferred alcohol has a molecular weight of 200 or less in particular. The specific compound includes, for instance: a monoalcohol such as methanol, ethanol, propanol, butanol, pentanol, hexanol, heptanol, octanol and nonanol; and dialcohol such as ethylene glycol, 1,3-butanediol, neopentyl glycol and 2-ethylhexane diol. Two or more of the compounds may be used in combination.

An isocyanurate trimer which is one of components in the present invention is a polyisocyanate which has an isocyanurate group, is formed of 3 molecules of a diisocyanate monomer, and is expressed by the following formula:

[Formula 1]

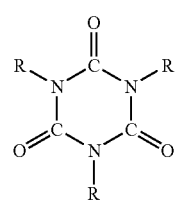

R: diisocyanate monomer residue

The concentration of the isocyanurate trimer is 55 to 95 mass %, and preferably is 60 to 95 mass %.

When the concentration is less than 55 mass %, the polyisocyanate composition causes the increase of viscosity or the decrease of crosslinkability. When the concentration exceeds 95 mass %, the polyisocyanate composition causes the increase of the viscosity.

An allophanate group which is one of components in the present invention is formed of an alcohol hydroxy group and an isocyanate group, and is expressed by the following formula:

[Formula 2]

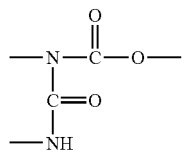

The number ratio of the allophanate group which is derived from an alcohol to the isocyanurate group is 1 to 20%, preferably is 1 to 10%, and further preferably is 1 to 5%. When the number ratio is less than 1%, the obtained polyisocyanate composition may cause the increase of viscosity. When the number ratio exceeds 20%, the obtained polyisocyanate composition may cause the decrease of crosslinkability. It was surprising that when the allophanate bond exists in the polyisocyanate composition, the polyisocyanate composition does not increase the concentration of a diisocyanate monomer even after having been stored for a long period of time.

An urethodione dimer which is one of components in the present invention, is a compound which is formed of 2 molecules of a diisocyanate monomer, has an urethodione group, and is expressed by the following formula:

[Formula 3]

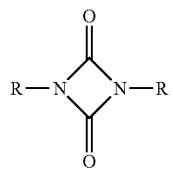

R: diisocyanate monomer residue

The concentration of the urethodione dimer is 2 to 25 mass %, and preferably is 5 to 25 mass %. When the concentration is less than 2 mass %, the polyisocyanate composition causes the increase of viscosity. When the concentration exceeds 25 mass %, the polyisocyanate composition causes the decrease of crosslinkability.

The concentration of a diisocyanate monomer in a polyisocyanate composition according to the present invention is preferably 1 mass % or less, and more preferably is 0.5 mass % or less. When the concentration exceeds 1 mass %, the polyisocyanate composition causes the decrease of crosslinkability, which is unfavorable.

The polyisocyanate composition according to the present invention has a viscosity of 150 to 800 mPa·s at 25° C., preferably of 150 to 700 mPa·s, and further preferably of 200 to 700 mPa·s. When the viscosity is lower than 150 mPa·s, the polyisocyanate composition causes the decrease of crosslinkability, and when the viscosity exceeds 800 mPa·s, the concentration of a solid content in a coating having employed the polyisocyanate composition decreases, which are unfavorable. When the viscosity and the concentration of the urethodione dimer are in the above described range, the obtained polyisocyanate composition acquires improved adhesiveness to a primer coating.

The concentration of an isocyanate group in a polyisocyanate composition according to the present invention is preferably 22 to 25 mass %. When the concentration is lower than 22 mass %, the physical properties of the coated film such as the hardness of the coated film is lowered, and when the concentration exceeds 25 mass %, the concentration of a diisocyanate monomer increases, which are unfavorable.

The present invention will now be described below through the exemplification of a specific production method.

A polyisocyanate composition according to the present invention can be obtained by the steps of: conducting an isocyanuration reaction which forms an isocyanurate group derived from an isocyanate group, an urethodionation reaction which forms an urethodione group, and an allophanation reaction derived from the isocyanate group and a hydroxy group of an alcohol in the presence of surplus diisocyanate monomers; and removing unreacted diisocyanate monomers after the reactions have been finished.

When a polyisocyanate containing an isocyanurate group is derived from the diisocyanate monomer, a catalyst for the isocyanuration reaction is normally used. A preferred specific catalyst for the isocyanuration reaction generally has basicity, and includes, for instance: (1) an hydroxide of a tetraalkylammonium such as tetramethylammonium and tetraethylammonium, and a salt of the tetraalkylammonium with an organic weak acid such as acetic acid and capric acid; (2) an hydroxide of a hydroxyalkylammonium such as trimethylhydroxypropylammonium, trimethylhydroxyethylammonium and triethylhydroxypropylammonium, triethylhydroxyethylammonium, and a salt of the hydroxyalkylammonium with an organic weak acid such as acetic acid and capric acid; (3) a salt of an alkylcarboxylic acid such as acetic acid, caproic acid, octylic acid and myristic acid with a metal such as tin, zinc, lead, sodium and potassium; (4) an alcoholate of a metal such as sodium and potassium; (5) a compound containing an aminosilyl group such as hexamethyldisilazane; (6) a Mannich base; and (7) a combination of a tertiary amine and an epoxy compound. A further preferred isocyanuration catalyst is a compound described in the items (1), (2) and (3), and the particularly preferred isocyanuration catalyst is the salt of the organic weak acid described in the item (1). The compound containing the aminosilyl group is unpreferable because of consequently producing polyisocyanate having a biuret group and a monoisocyanate having a urethane bond.

These catalysts are used in an amount of 10 to 1,000 ppm with respect to the mass of charged diisocyanate, preferably of 10 to 500 ppm, and further preferably of 10 to 100 ppm. The diisocyanate is subjected to an isocyanuration reaction at 50 to 120° C. and preferably at 60 to 90° C. When the isocyanuration reaction temperature exceeds 120° C., the polyisocyanate composition is colored, which is unfavorable.

The isocyanuration reaction is stopped by adding an acidic compound such as phosphoric acid and acid phosphate at a desired conversion ratio (mass ratio of polyisocyanate produced by isocyanuration reaction to charged diisocyanate monomer). In order to provide polyisocyanate according to the present invention, it is necessary to stop the reaction at an early stage of the progress. However, it is quite difficult to stop the reaction at the early stage of the progress, because an isocyanate group is converted into a ringed trimer at an extremely high reaction rate in the early stage. Accordingly, it is necessary to carefully select the reaction condition, particularly, an amount of the catalyst to be added and a method for adding the catalyst. A recommended preferable method includes, for instance, a method for adding the catalyst in fractional amounts several times at every fixed period. Accordingly, a conversion ratio in the isocyanuration reaction for obtaining an isocyanurate trimer in a concentration range according to the present invention is 25% or less and preferably is 20% or less. When the conversion ratio exceeds 25%, it may be difficult to obtain the isocyanurate trimer having a concentration satisfying the requirement of the present invention, and to impart both of high solidity and crosslinkability to the obtained polyisocyanate composition.

The obtained polyisocyanate containing the isocyanurate group may include a pentamer or heptamer of isocyanurate in addition to the trimer of isocyanurate. At this time, a polyisocyanate such as a polyisocyanate containing an urethodione group is occasionally produced other than the polyisocyanate containing the isocyanurate group at the same time. The concentration of an urethodione dimer produced in the isocyanuration reaction is 2 mass % or less, and preferably is 1 mass % or less with respect to polyisocyanate produced through the isocyanuration reaction. In other words, it is necessary to select such a catalyst as to produce a small amount of urethodione as a catalyst to be used in this step. Surprisingly, it was possible in particular to further inhibit the diisocyanate monomer from forming while the obtained polyisocyanate composition is stored, by conducting an isocyanuration reaction with the formation of an allophanate bond or in the presence of the allophanate bond, which will be described below.

A method for forming an allophanate bond of a polyisocyanate composition according to the present invention will now be described.

An alcohol is added into a diisocyanate monomer in an amount of 1,000/1 to 10/1 by an equivalent ratio of an isocyanate group of the diisocyanate monomer to a hydroxy group of the alcohol, and is preferably of 1,000/1 to 100/1. When the equivalent ratio is less than 10/1, the average number of isocyanate groups decreases, which is unfavorable. In order to produce an allophanate group, a catalyst for allophanate reaction is normally used. The specific compound for the catalyst includes an alkyl carboxylate of tin, lead, zinc, bismuth, zirconium and zirconyl, which includes: an organo-tin compound such as tin 2-ethylhexoate and tin dibutyldilaurate; an organo-lead compound such as lead 2-ethylhexoate; an organo-zinc compound such as zinc 2-ethylhexoate; bismuth 2-ethylhexoate; zirconium 2-ethylhexoate; and zirconyl 2-ethylhexoate. Two or more of the compounds can be used in combination.

The above described catalyst for the isocyanuration reaction can also be a catalyst for an allophanation reaction. When the allophanation reaction is conducted with the use of the above described catalyst of the isocyanuration reaction, a polyisocyanate containing the isocyanurate group is naturally produced. It is preferable for economically producing the polyisocyanate to use the above described catalyst for the isocyanuration reaction as the catalyst for the allophanate reaction and conduct the allophanation reaction and the isocyanuration reaction.

An urethodione dimer is obtained with the use of a catalyst for an urethodionation reaction. An example of the specific compound includes: a trialkylphosphine of a tertiary phosphine such as tri-n-butylphosphine and tri-n-octyl phosphine; a tris(dialkylamino)phosphine such as tris-(dimethylamino) phosphine; and a cycloalkylphosphine such as a cyclohexyl di-n-hexylphosphine. The majority of these compounds promotes the isocyanuration reaction simultaneously, and produces a polyisocyanate containing an isocyanurate group in addition to a polyisocyanate containing an urethodione group. When a yield has reached a desired value, the urethodionation reaction is stopped by adding an inactivator for the catalyst for the urethodionation reaction such as phosphoric acid and methyl para-toluenesulfonate.

The urethodione dimer can also be obtained by heating the diisocyanate monomer without using the above described catalyst. The heating temperature is 120° C. or higher and preferably is 150 to 170° C. The heating period of time is 1 Hr to 4 Hr.

It is a preferable process for obtaining a polyisocyanate composition according to the present invention to conduct a urethodionation reaction, the above described isocyanuration reaction and the allophanation reaction only by heating without using a catalyst for the urethodionation reaction, finish the reactions and remove unreacted diisocyanate monomers. It was surprising that the concentration of the unreacted diisocyanate monomer is low in the obtained polyisocyanate composition, and the polyisocyanate composition does not increase the concentration of the unreacted diisocyanate monomer after having been stored.

The above described isocyanuration reaction, allophanation reaction, and urethodionation reaction can be sequentially conducted, or some of them can be concurrently conducted. Preferably, the isocyanuration reaction and the allophanation reaction are concurrently conducted, and subsequently, the urethodionation reaction is conducted. Further preferably, the isocyanuration reaction and the allophanation reaction are simultaneously conducted with the use of a common catalyst, and subsequently the urethodionation reaction by heat is conducted. The method can simplify the production process, and accordingly is convenient.

The polyisocyanate composition according to the present invention can be obtained by removing the unreacted diisocyanate monomers from a reaction liquid after the reactions have been finished, through a thin-film distillation technique, an extraction technique or the like.

The concentration of the diisocyanate monomer in the polyisocyanate composition according to the present invention is preferably 1 mass % or less, more preferably is 0.5 mass % or less, and further preferably is 0.3% or less. When the concentration exceeds 1 mass %, the polyisocyanate composition causes the decrease of crosslinkability, which is unfavorable.

The average number of isocyanate groups of the obtained polyisocyanate composition (the statistical average number of isocyanate groups contained in one polyisocyanate molecule which is calculated through the expression described below) is 2.8 to 3.3, and preferably is 2.9 to 3.1. When the average number is less than 2.8, the polyisocyanate composition causes the decrease of crosslinkability and when the average number exceeds 3.3, the polyisocyanate composition may cause the increase of viscosity.

$$(\text{number-average molecular weight of the polyisocyanate} \times \text{concentration of isocyanate group} \times 0.01)/42 = \text{average number of isocyanate groups}$$

(The unit of the isocyanate group concentration is mass %.)

It was surprising that when the polyisocyanate composition according to the present invention has the average number of isocyanate groups of two, and has a specific concentration of a polyisocyanate containing an allophanate group derived from an urethodione dimer and a monoalcohol, the polyisocyanate composition has excellent crosslinkability in spite of showing low viscosity and imparts a formed coated film adequate weather resistance as well.

The polyisocyanate composition according to the present invention preferably does not include a biuret type polyisocyanate. When the biuret type polyisocyanate exists, the polyisocyanate composition causes increase in the number of diisocyanate monomers after having been stored, which is unpreferable. The biuret type polyisocyanate exists preferably in an amount of 0.5 mass % or less.

The polyisocyanate composition according to the present invention has a viscosity of 150 to 800 mPa·s at 25° C., and preferably of 150 to 700 mPa·s. When the viscosity is lower than 150 mPa·s, the polyisocyanate composition causes the decrease of crosslinkability, and when the viscosity exceeds 800 mPa·s, the concentration of a solid content in the coating decreases, which are unfavorable.

When the obtained polyisocyanate composition according to the present invention has been stored at 40° C. for a month, the concentration of the diisocyanate monomer increased by 0.5 mass % or less.

A block polyisocyanate can be obtained by blocking an isocyanate group of the obtained polyisocyanate composition with a blocking agent. A usable blocking agent in the present invention includes the following agents.

The usable blocking agent in the present invention is a compound having one active hydrogen atom in a molecule, and includes, for instance an alcoholic compound, an alkylphenolic compound, a phenolic compound, an active methylenic compound, a mercaptan-based compound, an acid-amide-based compound, an acid-imide-based compound, an imidazolic compound, a urea-based compound, an oximic compound, an aminic compound, an imide-based compound, and a pyrazolic compound. An example of a more specific blocking agent will now be described below.

(1) An alcohol such as methanol, ethanol, 2-propanol, n-butanol, sec-butanol, 2-ethyl-1-hexanol, 2-methoxyethanol, 2-ethoxyethanol and 2-butoxyethanol;

(2) an alkylphenolic compound that is a monoalkylphenol or a dialkylphenol which has an alkyl group having 4 or more carbon atoms as a substituent, like the mono-alkyl phenol such as n-propyl phenol, isopropylphenol, n-butylphenol, sec-butylphenol, t-butylphenol, n-hexylphenol, 2-ethylhexylphenol, n-octylphenol and n-nonylphenol, and the dialkylphenol such as di-n-propyl phenol, diisopropylphenol, isopropylcresol, di-n-butylphenol, di-t-butylphenol, di-sec-butylphenol, di-n-octyl phenol, di-2-ethylhexylphenol and di-n-nonylphenol;

(3) a phenolic compound such as phenol, cresol, ethylphenol, styrene phenol and hydroxybenzoate;

(4) an active methylenic compound such as dimethyl malonate, diethyl malonate, methyl acetoacetate, ethyl acetoacetate and acetylacetone;

(5) a mercapto compound such as butyl mercaptan and dodecyl mercaptan;

(6) an acid amide compound such as acetanilide, acetic acid amide, ε-caprolactam, δ-valerolactam and γ-butyrolactam;

(7) an acid imide compound such as succinic acid imide and maleic acid imide;

(8) an imidazolic compound such as glyoxaline and 2-carbinyl glyoxaline;

(9) an urea compound such as urea, thiourea and ethylene urea;

(10) an oxime compound such as formaldoxime, acetaldoxime, acetoxime, methylethyl ketoxime and cyclohexanone oxime;

(11) an amine compound such as diphenylamine, aniline, carbazole, di-n-propylamine, diisopropylamine and isopropyl ethylamine;

(12) an imine compound such as ethyleneimine and polyethyleneimine; and

(13) a pyrazolic compound such as pyrazole, 3-methylpyrazole and 3,5-dimethylpyrazole.

A preferred block agent includes at least one compound selected from among the alcoholic compound, the oximic compound, the acid amide compound, the active methylenic compound and the pyrazolic compound.

A coating composition according to the present invention can be obtained by mixing a polyol with a polyisocyanate composition according to the present invention as a curing agent. An example of the polyol usable here includes acryl polyol, polyester polyol, polyetherpolyol, and epoxy polyol.

An acrylic polyol includes: a polymerizable monomer having active hydrogen, which includes, for instance; an acrylic ester such as 2-hydroxyethyl acrylate, 2-hydroxypropyl acrylate and 2-hydroxybutyl acrylate; and acrylic monoester or methacrylic monoester of glycerol; acrylic monoester or methacrylic monoester of trimethylolpropane; and a methacrylic ester such as 2-hydroxyethyl methacrylate, 2-hydroxypropyl methacrylate, 2-hydroxybutyl methacrylate, 3-hydroxypropyl methacrylate and 4-hydroxybutyl methacrylate, as essential compounds: and an acrylic polyol which is obtained, as needed, by polymerizing a single compound or a mixture selected from the group consisting of: an acrylic ester such as methyl acrylate, ethyl acrylate, isopropyl acrylate, n-butyl acrylate and 2-ethylhexyl acrylate; a methacrylic ester such as methyl methacrylate, ethyl methacrylate, isopropyl methacrylate, n-butyl methacrylate, isobutyl methacrylate, n-hexyl methacrylate and lauryl methacrylate; an unsaturated carboxylic acid such as acrylic acid, methacrylic acid, maleic acid and itaconic acid; an unsaturated amide such as acrylamide, N-methylolacrylamide and diacetone acrylamide; glycidyl methacrylate; styrene; vinyltoluene; vinyl acetate; acrylonitrile; dibutyl fumarate; and a vinyl monomer having a hydrolyzable silyl group, such as vinyl trimethoxysilane, vinyl carbinyl dimethoxysilane and γ-(meth)acryloxy propyl trimethoxysilane.

An example of the polyester polyol includes: a polyester polyol which is obtained from a condensation reaction of a single compound or a mixture of dibasic acids selected from the group consisting of a carboxylic acid such as succinic acid, adipic acid, sebacic acid, dimer acid, maleic anhydride, phthalic anhydride, isophthalic acid, and terephthalic acid with a single compound or a mixture of polyalcohols selected from the group consisting of ethylene glycol, propylene glycol, diethylene glycol, neopentyl glycol, trimethylolpropane and glycerol; and a polycaprolactone obtained through a ring-opening polymerization of ε-caprolactone with a polyalcohol, for instance. These polyester polyols can be denatured with the use of an aromatic diisocyanate, an aliphatic diisocyanate, an alicyclic diisocyanate, and a polyisocyanate obtained from them. In this case, particularly, the aliphatic diisocyanate, the alicyclic diisocyanate and the polyisocyanate obtained from them are preferable, because of imparting the polyisocyanate composition excellent weather resistance and yellowing resistance.

The polyether polyol includes: a polyether polyol which is obtained by adding a single compound or a mixture of alkylene oxide such as ethylene oxide, propylene oxide, butylene oxide, cyclohexane oxide and styrene oxide to a single compound or a mixture of polyvalent hydroxy compounds with the use of a strongly basic catalyst such as a hydroxide, an alcoholate and an alkylamine of lithium, sodium and potassium, respectively; further a polyetherpolyol obtained by reacting a multifunctional compound such as diaminoethane with an alkylene oxide; and a so-called polymer polyol obtained by polymerizing acrylamide using any of these polyethers as a medium.

An example of the above described polyvalent hydroxy compound includes:

(1) diglycerin, ditrimethylolpropane, pentaerythritol and dipentaerythritol;

(2) a sugar alcoholic compound such as erythritol, D-threitol, L-arabinitol, ribitol, xylitol, sorbitol, mannitol, galactitol and rhamnitol;

(3) a monosaccharide such as arabinose, ribose, xylose, glucose, mannose, galactose, fructose, sorbose, rhamnose, fucose and ribodesose;

(4) a disaccharide such as trehalose, sucrose, maltose, cellobiose, gentiobiose, lactose and melibiose;

(5) a trisaccharide such as raffinose, gentianose and melezitose; and (6) a tetrasaccharide such as stachyose.

A preferred polyol is an acrylic polyol and polyester polyol. The acrylic polyol is particularly preferable.

An obtained polyol has 60 to 100 mass % of resin concentration. When the resin concentration is lower than 60 mass %, it is difficult to decrease the VOC. The obtained polyol has a molecular weight of 500 to 5,000. When the molecular weight exceeds 5,000, the obtained polyol has increased viscosity and hardly acquires a high resin concentration. When the molecular weight is smaller than 500, the mechanical properties of a cured coated film may be lowered. The polyol has a hydroxyl value of 30 to 300 mgKOH/g for the resin, and preferably of 30 to 200 mgKOH/g. The polyol can have an acid value up to 30 to 50 mg/KOH, as needed. The polyol has a glass transition point of −20 to 100° C. When the obtained polyol is an acrylic polyol, the glass transition point can be calculated from the expression of Fox.

A polyisocyanate composition in a coating composition according to the present invention has an equivalent ratio of an isocyanate group to a hydroxy group of a polyol preferably, of 5/1 to 1/5, more preferably of 5/3 to 3/5, and further preferably of 5/4 to 4/5.

The coating composition can also employ various solvents and additives according to the field of application and the purpose. The solvent can be appropriately selected from the group, for instance, consisting of: ketones such as acetone, methyl ethyl ketone and methyl isobutyl ketone; esters such as ethyl acetate, n-butyl acetate and cellosolve acetate; alcohols such as butanol and isopropyl alcohol; and hydrocarbons such as toluene, xylene, cyclohexane, mineral spirit and naphtha, and can be used according to the purpose and the application. These solvents may be used alone, or two or more of the solvents may be concomitantly used.

The coating composition may also employ the additives, as needed, which include: an accelerator like an organometallic compound such as a carboxylate of tin, zinc, lead and the like; an oxidation inhibitor such as hindered phenol; a UV absorber such as benzotriazol and benzophenone; a pigment such as titanium oxide, carbon black, indigo, quinacridon and perl mica; a metallic pigment such as aluminum; and a rheology control agent such as hydroxyethyl cellulose and a urea compound.

A resin concentration which is a mass ratio of a total amount of a polyol and a polyisocyanate composition to a coating composition according to the present invention is preferably 50 mass % or more and further preferably is 60 mass % or more.

Surprisingly, thus prepared coating composition according to the present invention strengthens physical properties of a primer coating. The effect is remarkable particularly when the primer coating is not yet cured. When the coating composition according to the present invention is coated on the uncured coating film and is cured, the coating composition remarkably improves the adhesiveness between the primer coating and the substrate.

Thus prepared coating composition can also be used for adhesives, ink, and a casting agent. A coating method includes a roll coating technique, a curtain flow coating technique, a spray coating technique, and cation and anion electrophoretic coating techniques. A material for an article to be coated includes a metal, plastic, cement, and an inorganic material such as calcium silicate and gypsum. When the coating composition according to the present invention is applied to these materials as the primer coating, a top coating or an intermediate coating, the coating composition can impart good appearance, weather resistance, acid resistance, rust resistance and chipping resistance to a pre-coated metal including a rust-preventive steel sheet and an automotive coating, which is useful.

The coating composition according to the present invention is useful particularly as a top clear coat which is to be coated on a non-aqueous base coat or aqueous base coat containing pigment, because of forming a coated film which has a urethane bond, is tough, has high hardness, adequate chemical resistance, and further has superior adhesiveness to an organic coating film. The base coat and the top clear coat are preferably cured at the same time.

EXAMPLES

The present invention will now be described in more detail with reference to examples, but the present invention is not limited to the examples described below.

(Measurement of the Number Average Molecular Weight)

The number average molecular weight is the number average molecular weight according to a polystyrene criterion which is measured with a gel permeation chromatography using the following instrument.

Instrument: HLC-802A (trade name) made by TOSOH CORPORATION;

Column: G1000HXL×1 cylinder made by TOSOH CORPORATION;

G2000HXL×1 cylinder

G3000HXL×1 cylinder

Carrier: tetrahydrofuran, and

Detecting method: differential refractometer.

(Viscosity Measurement)

Viscosity was measured at 25° C. with the use of an E-type viscosity meter made by Tokimec Inc.

(Measurement on Concentration of Isocyanurate Trimer)

The example was subjected to the same gel permeation chromatography as in the measurement on the number average molecular weight, and the concentration of an isocyanurate trimer was expressed by a percentage of a peak area corresponding to the molecular weight of three times diisocyanate.

(Number Ratio of Allophanate Groups to Isocyanurate Groups)

The number ratio of allophanate groups to isocyanurate groups was determined through measuring a proton nuclear magnetic resonance spectrum by using FT-NMR DPX-400 (trade name) made by Bruker Corporation.

(Measurement on Concentration of Urethodione Dimer)

The example was subjected to the same gel permeation chromatography as in the measurement on the number average molecular weight, and the concentration of an urethodione dimer was expressed by a percentage of a peak area corresponding to the molecular weight of two times diisocyanate.

(Measurement on Conversion Ratio in Isocyanuration Reaction)

A conversion ratio was determined by measuring a refractive index in a reaction liquid.

(Concentration of Diisocyanate Monomer Before and After Storage of Polyisocyanate Composition)

The concentration of a diisocyanate monomer was determined by the steps of: storing a polyisocyanate composition in a nitrogen atmosphere at 40° C. for one month; and then measuring the amount of a diisocyanate monomer with a gas chromatograph technique on the following conditions. When the concentration of the diisocyanate monomer increased by 0.5 mass % or less after the storage, the result was shown by ○, and when the concentration of the diisocyanate monomer increased by more than 0.5 mass %, the result was shown by x.

Gas chromatography measurement conditions
Column: 1 m of silicon OV17
Inlet temperature: 160° C., and Column temperature: 120° C.
Carrier: nitrogen, and
Detector: hydrogen flame ionization detector.

(High Solidity)

A composition was prepared by the steps of: mixing an acryl polyol (Trade name of Setalux 1903 having resin solid content of 75% and hydroxyl value of 150 mg-KOH/g-resin made by Akzo Corporation) with the polyisocyanate so that an equivalent ratio of hydroxy groups to isocyanate groups could be 1.0; and diluting the mixture by using a liquid mixture of ethyl acetate/toluene/butyl acetate/xylene/propyleneglycol monomethyl ether acetate (mass ratio of 30/30/20/15/5) as a thinner so that the diluted solution could show the viscosity of 20 seconds when measured by a ford cup No. 4. The solid content of a coating having the above described composition was measured. When the solid content was 55% or more, the solidity was expressed by ○, and when the solid content was less than 55%, the solidity was expressed by x.

(Gel Fraction)

Gel fraction was determined by the steps of: applying the example onto a polypropylene plate with an applicator so as to form a coated resin film with the thickness of 50 μm; curing the coated resin film by leaving the film at 20° C. in the humidity of 65 Rh % for 24 Hr; dissolving the cured film by immersing it in acetone at 20° C. for 24 hours; measuring the mass of an undissolved part and the mass of the film before being immersed; and calculating a ratio of the former mass to the latter mass. When the ratio was less than 80%, the result was expressed by x, when the ratio was 80% or more but less than 90%, the result was expressed by ○, and when the ratio was 90% or more, the result was expressed by ⊚.

(Hardness of Coated Film)

The hardness of a coated film was determined by the steps of: applying the example onto a glass plate; curing the coated film at 90° C. for 30 minutes to form the coated film with a thickness of 50 μm; measuring the Koenig hardness of the coated film at 20° C. with a pendulum-type hardness gauge made by BYK Chemie Corporation. When the hardness of the coated film was less than 50, the hardness was evaluated as x, and when the hardness of the coated film was 50 or more, the hardness was evaluated as ○.

(Adhesiveness to Primer Coating)

A sample was prepared by the steps of: coating an acryl polyol (having resin solid content of 55% and hydroxyl value of 30 mg-KOH/g-resin) on a soft steel sheet so that a resin film could be 40 micrometers thick; leaving the coated film at room temperature for 30 minutes; preparing a coating composition by blending an acryl polyol (a product name of Setalux 1903 having hydroxyl value of 150 mg-KOH/g-resin made by Akzo Corporation) with the polyisocyanate so that an equivalent ratio of hydroxyl groups to isocyanate groups could be 1:1.3, and then diluting the mixture with a thinner (ethyl acetate/toluene/butyl acetate/xylene/propylene glycolmonomethyl ether acetate=30/30/20/15/5 (mass ratio)) so that the viscosity of the coating was adjusted into 20 seconds when measured by using a ford cup No. 4; applying the coating composition on a substrate so as to form a resin film with the thickness of 30 micrometers; leaving it at room temperature for 15 minutes; and curing the coating film by placing the coated soft steel sheet at 90° C. in an oven for 30 minutes. The adhesiveness of the prepared coated film was tested according to JIS K5600-5-6. When the coated film was not peeled off, the result was expressed by ○, and when the coated film was peeled off, the result was expressed by x.

Example 1

Preparation of Polyisocyanate Composition

HDI was reacted with isobutanol by the steps of: attaching a stirrer, a thermometer, a reflux cooling pipe, a nitrogen-blowing pipe and a dripping funnel to a four-mouth flask; converting the inside of the flask into nitrogen atmosphere; charging 600 parts of HDI and 0.6 parts of isobutanol into the flask; and keeping the inside of the reactor at 80° C. for 2 Hr while stirring the liquid. Subsequently, tetramethylammonium capriate of a catalyst for an isocyanuration reaction was added to the resultant liquid to conduct an isocyanuration reaction. When the conversion ratio reached 20%, phosphoric acid was added to stop the reaction. The reaction increased the mass concentration of an urethodione dimer by 1%, or less. The reaction liquid was further kept at 160° C. for 1 Hr. A polyisocyanate containing an urethodione group was produced by the heating step. A polyisocyanate composition was obtained by the steps of: cooling the reaction liquid; filtrating the cooled liquid; and then removing unreacted HDI by using a thin-film vaporizer. The characteristics of the obtained polyisocyanate composition are shown in Table 1.

Example 2

The example was prepared in the same way as in Example 1, except that an isocyanuration reaction was stopped when the conversion ratio reached 13%. The results are shown in Table 1.

Example 3

The example was prepared in the same way as in Example 1, except that an isocyanuration reaction was stopped when the conversion ratio reached 8%. The results are shown in Table 1.

Comparative Example 1

The example was prepared in the same way as in Example 1, except that an isocyanuration reaction was stopped when the conversion ratio reached 31%. The results are shown in Table 1.

Comparative Example 2

The example was prepared in the same way as in Example 1, except that isobutanol, a catalyst for an isocyanuration reaction and phosphoric acid were not used. The results are shown in Table 1.

Comparative Example 3

A similar device to that used in Example 1 was prepared, the inside was converted into nitrogen atmosphere, 600 parts of HDI were charged, and the liquid in the reactor was held at 160° C. for 1.5 Hr while having been stirred. Subsequently, the temperature in the reactor was lowered to 140° C., 6 parts of hexamethyldisilazane which is a catalyst for an isocyanuration reaction were added into the reactor, and the mixture was kept for 30 minutes. The temperature in the reactor was further lowered to 90° C., 3.3 parts of n-butanol were added into the reactor, and the mixture was kept for 1 Hr. The reaction liquid was cooled, and unreacted HDI was removed from the liquid by using a thin-film vaporizer. The results are shown in Table 1.

Comparative Example 4

A similar device to that used in Example 1 was prepared, the inside was converted into nitrogen atmosphere, 600 parts of HDI and 4.8 g of isobutanol were charged, and the liquid in the reactor was held at 90° C. for 1.0 Hr while having been stirred. Subsequently, the temperature in the reactor was further lowered to 70° C., and tetramethylammonium capriate of a catalyst for an isocyanuration reaction was added to the resultant liquid to conduct an allophanate reaction and an isocyanurate reaction. When the conversion ratio reached 25%, phosphoric acid was added to stop the reaction. The reaction liquid was cooled and filtered, and unreacted HDI was removed from the liquid by using a thin-film vaporizer. The characteristics of the obtained polyisocyanate composition are shown in Table 1.

Examples 4 to 6, and Comparative Examples 5 to 8

Coating compositions were prepared by the steps of: blending an acryl polyol (Setalux 1903 by product name having hydroxyl value of 150 mg-KOH/g-resin and made by Akzo Corporation) with the polyisocyanate composition so that an equivalent ratio of hydroxyl groups to isocyanate groups could be 1.0; and then diluting the mixture with a thinner (ethyl acetate/toluene/butyl acetate/xylene/propylene glycolmonomethyl ether acetate=30/30/20/15/5 (mass ratio)) so that the viscosity of the coating was adjusted into 20 seconds when measured by using a ford cup No. 4. The hardness and gel fraction of the coated film were evaluated. The results are shown in Table 2.

[Table 1]

TABLE 1

| | Characteristic of polyisocyanate | | | | | | | | | |
|---|---|---|---|---|---|---|---|---|---|---|
| | Trimer concentration | A/N ratio | Ut-1 concentration | Ut-2 concentration | Di concentration | NCO concentration | Number average molecular weight | Average number of NCO | Yield | Viscosity |
| Example 1 | 60 | 2.4 | <1 | 12 | 0.1 | 23.0 | 570 | 3.1 | 23 | 620 |
| Example 2 | 63 | 1.7 | <1 | 15 | 0.2 | 23.5 | 530 | 3.0 | 17 | 410 |
| Example 3 | 62 | 1.1 | <1 | 21 | 0.1 | 23.6 | 510 | 2.9 | 12 | 240 |
| Comparative Example 1 | 53 | 1.7 | <1 | 7 | 0.1 | 22.3 | 570 | 3.0 | 35 | 1310 |
| Comparative Example 2 | 13 | 0 | — | 79 | 0.2 | 24.2 | 410 | 2.4 | 5 | 35 |
| Comparative Example 3 | 56 | 0 | 5.1 | 16 | 0.2 | 23.4 | 560 | 3.1 | 21 | 450 |
| Comparative Example 4 | 57 | 22 | <1 | <1 | 0.2 | 22.8 | 500 | 2.7 | 25 | 500 |

Description of unit and the like;

Trimer concentration; mass % of polyisocyanate containing isocyanurate group, which consists of 3 molecules of diisocyanate monomer, A/N concentration; number ratio of allophanate groups to isocyanurate groups, Ut-1 concentration; mass % of urethodione dimmer in polyisocyanate (excluding unreacted diisocyanate) produced through isocyanuration reaction, Ut-2 concentration; mass concentration of urethodione dimmer after unreacted diisocyanate monomer has been removed, Di concentration; mass % of diisocyanate monomer, Viscosity; mPa · s at 25° C., NCO concentration; mass concentration (%) of isocyanate groups, Number average molecular weight; number average molecular weight of polyisocyanate composition, Average number of NCO; average number of isocyanate groups, and, Yield; mass ratio (%) of polyisocyanate composition to charged raw material.

[Table 2]

TABLE 2

| | Curing agent | High solidity | Storage stability Di concentration after storage | Evaluation for coated film | | |
|---|---|---|---|---|---|---|
| | | | | Gel fraction | Hardness of coated film | Adhesiveness to primer coating |
| Example 4 | Example 1 | ○ | ○ | ○ | ○ | ○ |
| Example 5 | Example 2 | ○ | ○ | ○ | ○ | ○ |
| Example 6 | Example 3 | ○ | ○ | ○ | ○ | ○ |
| Comparative Example 5 | Comparative Example 1 | X | ○ | ○ | ○ | X |
| Comparative Example 6 | Comparative Example 2 | ○ | X | X | X | X |
| Comparative Example 7 | Comparative Example 3 | ○ | X | ○ | ○ | ○ |
| Comparative Example 8 | Comparative Example 4 | ○ | ○ | X | X | X |

Di concentration after storage; mass concentration (%) of diisocyanate monomer after storage

The invention claimed is:

1. A polyisocyanate composition derived from an aliphatic diisocyanate monomer and an alcohol and satisfies all of the following requirements when the composition contains no aliphatic diisocyanate monomer and no solvent:
   1) the concentration of an isocyanurate trimer is 55 mass % to 95 mass %;
   2) the number ratio of allophanate groups derived from the alcohol to isocyanurate groups is 1 to 5%;
   3) the concentration of an urethodione dimer is 2 to 25 mass %; and
   4) a viscosity at 25% is 150 to 800 mPa·s.

2. The polyisocyanate composition according to claim 1, wherein the alcohol is a monoalcohol.

3. The polyisocyanate composition according to claim 1 or 2, wherein the concentration of the isocyanurate trimer is 60 to 95 mass %.

4. The polyisocyanate composition according to claim 3, wherein the aliphatic diisocyanate is hexamethylene diisocyanate.

5. A coating composition comprising a polyol and the polyisocyanate composition according to anyone of claims 1 or 2.

* * * * *

UNITED STATES PATENT AND TRADEMARK OFFICE
CERTIFICATE OF CORRECTION

PATENT NO. : 7,834,103 B2
APPLICATION NO. : 12/066442
DATED : November 16, 2010
INVENTOR(S) : Yoshiyuki Asahina et al.

It is certified that error appears in the above-identified patent and that said Letters Patent is hereby corrected as shown below:

On the Title Page, Item (57), in the Abstract, line 7, "dimmer" should read --dimer--.

Signed and Sealed this
Fifth Day of April, 2011

David J. Kappos
*Director of the United States Patent and Trademark Office*